United States Patent [19]
Zmelty et al.

[11] Patent Number: 5,962,115
[45] Date of Patent: Oct. 5, 1999

[54] PANE OF TRANSPARENT MATERIAL HAVING A LOW EMISSIVITY

[75] Inventors: Anton Zmelty, Hösbach; Joachim Szczyrbowski, Goldbach; Christoph Braatz, Hainstadt, all of Germany

[73] Assignee: Balzers und Leybold Deutschland Holding AG, Main, Germany

[21] Appl. No.: 08/664,192

[22] Filed: Jun. 10, 1996

[30] Foreign Application Priority Data

Jun. 8, 1995 [DE] Germany .................. 195 29 843

[51] Int. Cl.[6] ................................................ B32B 15/04
[52] U.S. Cl. .................... 428/216; 428/212; 428/336; 428/426; 428/428; 428/432; 428/472; 428/697; 428/698; 428/699; 428/701; 428/702; 359/359; 359/580; 359/585; 359/589
[58] Field of Search ................... 428/428, 432, 428/433, 698, 699, 697, 701, 702, 216, 212, 336, 426, 472; 359/359, 580, 585, 589

[56] References Cited

U.S. PATENT DOCUMENTS

| | | | |
|---|---|---|---|
| 4,413,877 | 11/1983 | Suzuki et al. | 350/1.7 |
| 5,271,994 | 12/1993 | Termath | 428/216 |
| 5,413,864 | 5/1995 | Miyazaki et al. | 428/432 |

FOREIGN PATENT DOCUMENTS 2701475  8/1994  France.

*Primary Examiner*—Archene Turner
*Attorney, Agent, or Firm*—Fulbright & Jaworski, LLP.

[57] ABSTRACT

A system of layers applied to a transparent substrate includes a first layer of an oxide such as ZnO or $SnO_2$, a second layer of a substoichiometric oxide of Zn or Ta, a third layer of Ag or Cu, a fourth layer of a substoichiometric oxide of Ti, Cr, or Nb, and a fifth layer of similar composition as the first layer. The layers are preferably deposited by magnetron cathode sputtering in an atmosphere which consists of inert gas and, in the case of the oxide layers, a reactive gas.

10 Claims, 2 Drawing Sheets

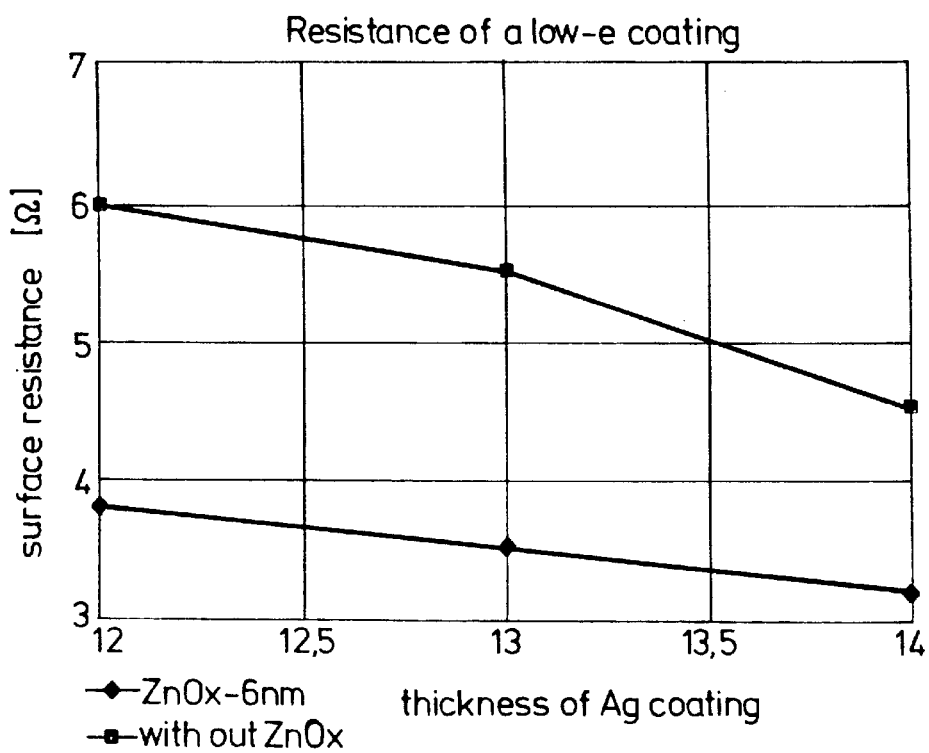
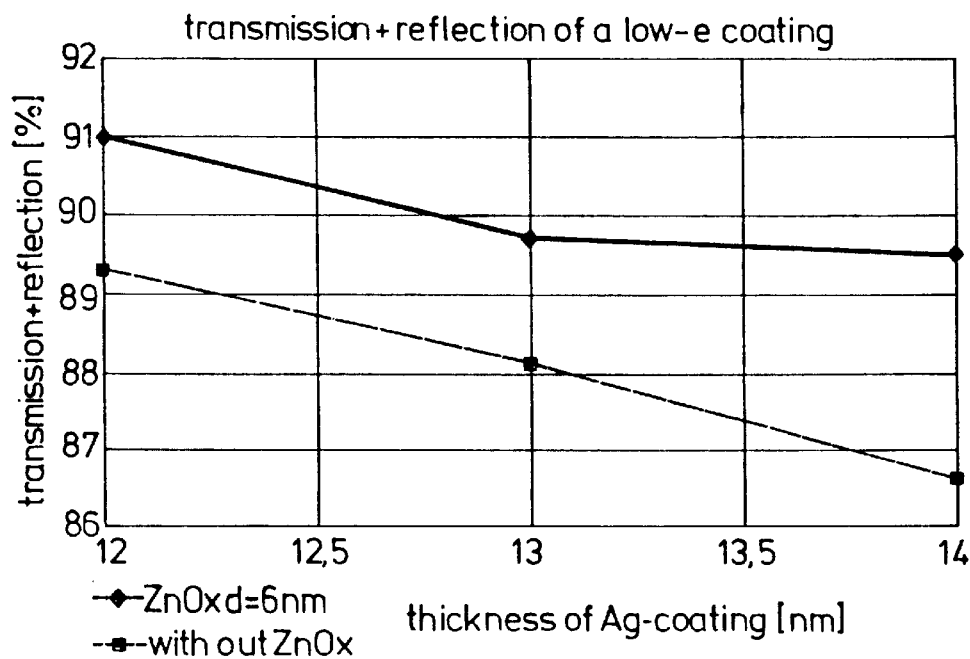

PANE OF TRANSPARENT MATERIAL HAVING A LOW EMISSIVITY

BACKGROUND OF THE INVENTION

The invention pertains to a pane of transparent material with high transparency in the visible range and with very high reflectivity in the thermal radiation range and also to a process for its production.

Panes of this type should have high chemical resistance to moisture, especially to NaCl-water and $SO_2$-water solutions in certain concentrations.

The invention also pertains to the production of a pane of this type by a coating process based on cathode sputtering.

Windows with panes of this type should in particular prevent radiant heat from escaping from a room to the outside in winter. Known layer systems of this type are referred to as "low-e" ("low emissivity").

Conventional low-e systems consist of various categories of layers, which are designed to have different properties and which are expected to perform different functions in the system:

(a) a layer with high conductivity for electricity, often consisting of a metal such as Ag, Au, or Cu, but with a very low radiation emission coefficient, represents the actual low-e (low-emissivity) coating;

(b) but because a metal layer is also highly reflective to light (a low degree of light transmission) in the visible range, additional transparent layers are deposited to reduce its reflectivity. Other functions of these transparent layers are to provide the desired color tone and to give the system a high level of mechanical and chemical resistance;

(c) to protect the thin metal layer against aggressive atmospheres in the environment both during and after the production process and also to ensure the good adhesion of the adjacent oxide layer, a so-called blocker layer (barrier layer, primer layer) of a metal or suboxide is often applied to this metal layer (Ag, Au, Cu).

To accomplish all these tasks, a conventional low-e coating is built up of the following components:

| substrate | oxide | Ag | blocker | oxide |
| --- | --- | --- | --- | --- | where the substrate is a pane of transparent inorganic or organic glass or a transparent organic film; Ag is an electrically conductive layer; the oxides form the antireflective coating; and the blocker forms a protective layer for the Ag and also serves as a bonding agent with respect to the oxide layer.

The light transmission of a conventional low-e coating on a 4-mm glass substrate is approximately 80–86%. The thermal transmission through a pane of glass such as this depends on the emissivity $\epsilon$ of the low-e coating and can be described here by means of the simple formula:

$$\epsilon \approx 0.0141 \times R_\blacksquare,$$

where $R_\blacksquare = \rho/d$, and $R_\blacksquare$ = the surface resistance of the silver layer;

d = the thickness of the layer; and $\rho$ = the resistivity.

The above formula describes the emissivity of a thin metal layer with sufficient accuracy as long as the value is smaller than 0.2. For the known low-e coatings, $\epsilon$ is approximately 0.1.

The lower the emissivity, the smaller the radiation losses through the coating. The emissivity can be suppressed either by lowering the resistivity or by increasing the thickness of the layer. When the thickness of the layer is increased, the amount of light which is absorbed also increases, which leads to an undesirable reduction in the amount of light transmitted. A reduction in the resistivity of the Ag layer, however, leads not only to a reduction in the emissivity but also to an increase in the amount of light transmitted.

The resistivity of a thin layer can be described as follows:

$$\rho = \rho_K + \rho_F + \rho_G,$$

where:

$\rho_K$ is the resistivity of a monocrystalline layer of infinite thickness;

$\rho_F$ is the component of the resistivity caused by electron scattering along the layer surfaces; and $\rho_G$ is the component of the resistivity caused by electron scattering along the grain boundaries of the individual crystalline grains.

The resistivity $\rho_K$ of the very thick, monocrystalline Ag layer depends on the purity of the metal. Even a very small amount of foreign material can considerably increase the resistance of the layer. This means that the sputtering process should be carried out in a gas atmosphere of such a kind that none of its atoms is introduced into the silver layer.

The resistivity $\rho_F$ of a thin layer depends on the roughness of the layer surfaces. It is important for the lower oxide layer, on which the silver grows, to be very smooth. Thus this component of the electron scattering can be significantly reduced.

The resistivity $\rho_G$ depends on the size of the grains and on the type of grain boundaries between the individual grains. The smaller the grains and the wider and denser the grain boundaries, the greater the electron scattering. The size of the silver grains can be influenced by suitable preparation of the substrate surface. The oxide under the silver should promote the growth of the silver, which will lead to larger grains. In addition, the oxide elements may not diffuse into the silver layer. Foreign atoms diffuse into a layer primarily along the grain boundaries, which leads to an increase in density and thus to greater electron scattering.

SUMMARY OF THE INVENTION

The present invention increases the conductivity of the silver layer in a low-e coating and thus achieves a pane of insulating glass with better thermal insulating properties. This is done without any reduction in the light transmission and without any impairment to the mechanical or chemical resistance of the overall coating.

According to the invention, an additional thin layer is provided under the silver layer, which ensures a very smooth surface, the atoms of this additional layer diffusing to only a very slight extent if at all into the silver. The material of the additional layer is also selected so that it promotes the growth of the silver. In this way, the conductivity of the Ag layer can be increased by up to 30%. Suitable layer materials include substoichiometric oxides of the metals Zn and Ta and mixtures thereof.

A layer system according to the invention is built up as follows:

```
substrate | oxide | TaOₓ | Ag | blocker | oxide            (1)
substrate | oxide | ZnOₓ | Ag | blocker | oxide            (2)
substrate | oxide | ZnTaOₓ | Ag | blocker | oxide          (3)
substrate | oxide | ZnOₓ | Ag | blocker |                  (4)
   oxide | ZnOₓ | Ag | blocker | oxide
```

The individual thicknesses in Examples 1–3 are:
first oxide layer, about 40 nm;
second layer, about 4 nm;
the Ag layer, about 6 nm;
the blocker layer, about 1.5 nm; and
the last oxide layer, about 38 nm.

System (4) comprises two Ag layers. As a result of the second Ag layer, the electrical conductivity of the layer package is approximately doubled.

The surprising discovery has been made that a thin, substoichiometric $ZnO_x$, $TaO_x$, or $ZnTaO_x$ layer can significantly increase the conductivity of Ag and in addition acts as a highly effective bonding agent between Ag and the oxide layer. The mechanical and chemical resistance of the system is ensured by the blocker on the silver layer.

Panes according to the invention can be produced in an especially advantageous manner in that the layers are applied under vacuum by means of magnetron cathode sputtering. When a continuous system is used, the process makes it possible to coat large panes of glass very economically. The metal layers are applied by sputtering in an oxygen-free atmosphere. The oxide layers and the substoichiometric Zn or Ta oxides or the oxides of their alloys can be applied by means of reactive magnetron cathode sputtering of metallic or alloy targets in an oxygen-containing atmosphere.

BRIEF DESCRIPTION OF THE DRAWINGS

FIG. 2 is a plot of surface resistance versus thickness of the Ag layer, with and without $ZnO_x$; and FIG. 3 is a plot of transmission plus reflection of the low-e coating versus thickness of the Ag layer, with and without $ZnO_z$.

DETAILED DESCRIPTION OF THE PREFERRED EMBODIMENTS

Figure 1:
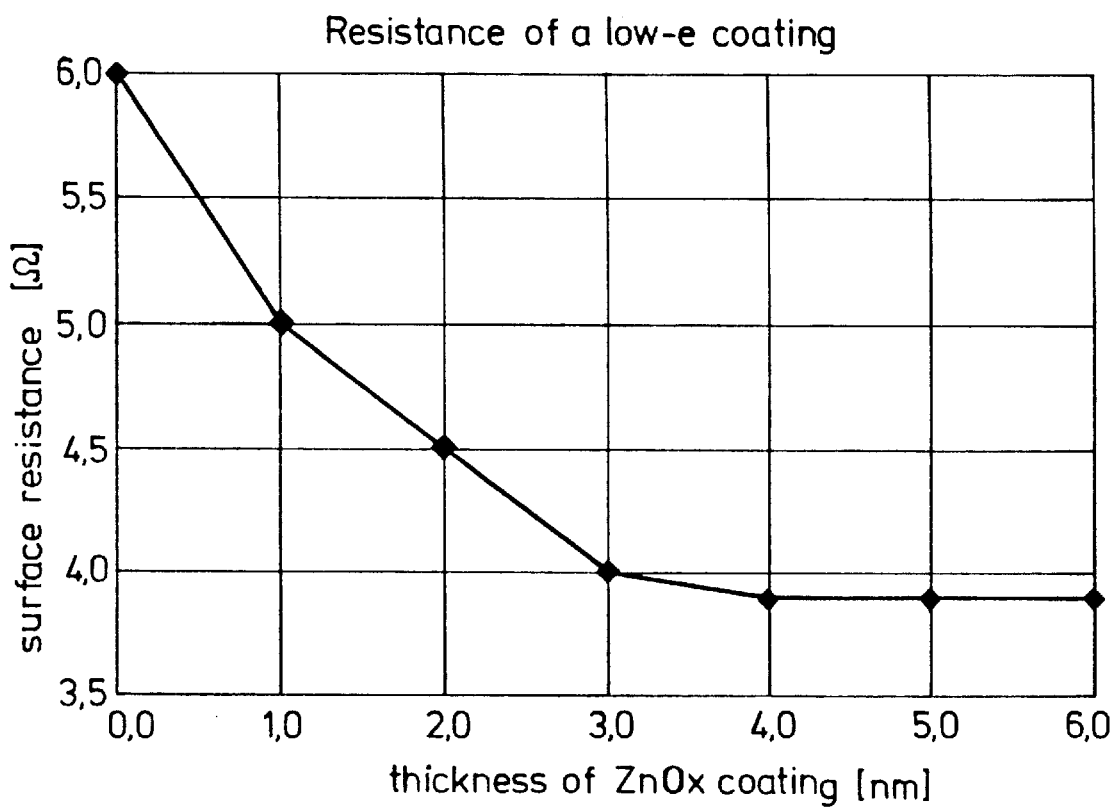
FIG. 1 is a plot of resistance versus thickness of a $ZnO_x$ coating.

In a sputtering system according to Example I (Table I), the following layers were applied in succession to a 2-mm-thick pane of float glass measuring 50×50 mm:

a $BiAlO_x$ layer in a thickness of 22 nm by the reactive sputtering of a BiAl target with 4 atom % of Al in an argon-oxygen atmosphere at a pressure of $3\times10^{-3}$ mbar;

an Ag layer with a thickness of 12 nm by the sputtering of an Ag target in an argon atmosphere at a pressure of $3\times10^{-3}$ mbar;

a substoichiometric $TiO_x$ layer with a thickness of 2 nm by the sputtering a Ti target in an argon-oxygen atmosphere at a pressure of $3\times10^{-3}$ mbar; and a $SnMgO_2$ layer in a thickness of approximately 38 nm by the reactive sputtering of a SnMg target with 10 atom % of Mg in an argon-oxygen atmosphere at a pressure of $3\times10^{-3}$ mbar.

In Examples 2–6 (Table I), only the thickness of the second layer ($ZnO_x$) was changed.

The exact values of the individual layer thicknesses and the measured light transmission, reflection, and surface resistance values of the layer systems thus produced are listed in Table I. FIG. 1 shows the measured surface resistance of the layer systems produced as a function of the thickness of the $ZnO_x$. It can be seen that, as the thickness of the $ZnO_x$ increases up to about 4 nm, the resistance of the Ag layer decreases and then remains constant. The measured increase in the conductivity of the Ag is greater than 30%.

Table II shows three pairs of low-e coatings. The samples of one pair differ only in that one of them includes a $ZnO_x$ layer while the other does not. It can be seen that the thin $ZnO_x$ layer not only increases the electrical conductivity but also improves the optical properties. This is especially evident upon consideration of the sum of $T_y+R_y$. This value is always higher for the sample which includes the $ZnO_x$ layer. The difference increases with increasing conductivity of the Ag layer. The transmission and reflection values cannot be easily compared with each other, because the individual layer systems were not optimized in terms of their optical properties. In this case, only the sum $T_y+R_y$ is relevant to the evaluation.

TABLE I

| No. | BiAl-Oxide (nm) | $ZnO_x$ (nm) | Ag (nm) | $TiO_x$ (nm) | SnMg-Oxide (nm) | R (Ω) | Ty (%) | Ry (%) | Ty + Ry (%) |
|---|---|---|---|---|---|---|---|---|---|
| 1 | 22 | — | 12 | 2 | 38 | 6.0 | 82.2 | 1.1 | 89.3 |
| 2 | 22 | 1 | 12 | 2 | 38 | 5.0 | 82.8 | 6.3 | 89.1 |
| 3 | 22 | 2 | 12 | 2 | 38 | 4.5 | 83.8 | 6.2 | 90.0 |
| 4 | 22 | 3 | 12 | 2 | 38 | 4.0 | 83.8 | 6.2 | 90.0 |
| 5 | 22 | 4 | 12 | 2 | 38 | 3.9 | 84.8 | 6.5 | 91.3 |
| 6 | 22 | 5 | 12 | 2 | 38 | 3.9 | 85.3 | 5.6 | 91.0 |
| 7 | 22 | 6 | 12 | 2 | 38 | 3.8 | 85.0 | 5.6 | 91.0 |

TABLE II

| No. | BiAl-Oxide (nm) | $ZnO_x$ (nm) | Ag (nm) | $TiO_x$ (nm) | SnMg-Oxide (nm) | R (Ω) | Ty (%) | Ry (%) | Ty + Ry (%) |
|---|---|---|---|---|---|---|---|---|---|
| 1 | 22 | — | 12 | 2 | 38 | 6.0 | 82.2 | 1.1 | 89.3 |
| 7 | 22 | 6 | 12 | 2 | 38 | 3.8 | 85.0 | 5.6 | 91.0 |
| 8 | 22 | — | 13 | 2 | 38 | 5.4 | 82.7 | 5.4 | 88.1 |

TABLE II-continued

| No. | BiAl-Oxide (nm) | ZnO$_x$ (nm) | Ag (nm) | TiO$_x$ (nm) | SnMg-Oxide (nm) | R (Ω) | Ty (%) | Ry (%) | Ty + Ry (%) |
|---|---|---|---|---|---|---|---|---|---|
| 9  | 22 | 6 | 13 | 2 | 38 | 3.5 | 83.5 | 6.1 | 89.7 |
| 10 | 22 | — | 14 | 2 | 38 | 4.5 | 82.3 | 4.3 | 86.6 |
| 11 | 22 | 6 | 14 | 2 | 38 | 3.2 | 83.0 | 6.5 | 89.5 |

Table III shows low-e systems in which SnMg oxide was used for the two antireflective layers. In this case, too, the layer with ZnO$_x$ has much greater conductivity and a larger total for $T_y + R_y$.

TABLE III

| No. | BiAl-Oxide (nm) | ZnO$_x$ (nm) | Ag (nm) | TiO$_x$ (nm) | SnMg-Oxide (nm) | R (Ω) | Ty (%) | Ry (%) | Ty + Ry (%) |
|---|---|---|---|---|---|---|---|---|---|
| 12 | 40 | — | 90 | 2 | 42 | 8.0 | 83.6 | 3.7 | 87.3 |
| 14 | 40 | 6 | 90 | 2 | 42 | 6.4 | 84.5 | 4.5 | 89.0 |

What is claimed is:

1. Pane of transparent material with a substrate and a layer system provided on one side of the substrate, wherein said layer system comprises
   (a) a first layer selected from at least one of ZnO, SnO$_2$, In$_2$O$_3$, Bi$_2$O$_3$, TiO$_2$, ZrO$_2$, Ta$_2$O$_5$, SiO$_2$, Al$_2$O$_3$, or selected from one at least one of AlN or Si$_3$N, or selected from at least one of the oxynitrides of aluminum, titanium, zirconium, and silicon, is deposited in a thickness of 20–70 nm on the substrate;
   (b) a second layer comprises at least one oxide selected from the group consisting of Ta$_2$O$_x$ and a mixture comprising ZnO$_x$ and TaO$_x$ in a thickness of 1 to 9 nm in the first layer wherein X is a number that results in a substoichiometric ratio of oxygen to either Zn or Ta;
   (c) a third layer selected from at least one of Ag and Cu is applied in a thickness of 5–30 nm on the second layer;
   (d) a fourth layer of at least one of the metals Ti, Cr, and Nb, or an alloy with at least 15 atom % of one of Ti, Cr, and Nb is deposited on said third layer as one of a metal layer or a substoichiometric metal oxide layer in a thickness of 0.5–5 nm, and
   (e) a fifth layer selected from at least one of ZnO, SnO$_2$, In$_3$O$_3$, Bi$_2$O$_3$, TiO$_2$, ZrO$_2$, Ta$_2$O$_5$, SiO$_2$, Al$_2$O$_3$, or selected from one at least one of AlN or Si$_3$N, or selected from at least one of the oxynitrides of aluminum, titanium, zirconium, and silicon is deposited in a thickness of 20–70 nm on the substrate is deposited on said fourth layer.

2. Pane according to claim 1, wherein at least one of the first and the fifth layers consists of at least one of SnO$_2$, In$_2$O$_3$, TiO$_2$, and Bi$_2$O$_3$, and 0–20 atom % of at least one oxide of Mg, Al, P, Ti, Y, Zr, and Ta.

3. Pane according to claim 1 wherein at least one of the first and fifth layers consists of at least one of SnO$_2$, In$_2$O$_3$, TiO$_2$, and Bi$_2$O$_3$, and 0–5 atom % of an oxide of an element having an atomic number of 57–71.

4. Pane according to claim 1, wherein the second layer has a thickness of approximately 5 nm.

5. Pane according to claim 1, wherein an additional layer is deposited between the third and the fourth layer, said additional layer being a substoichiometric oxide of at least one of Zn and Ta in a thickness of 1–40 nm.

6. Pane according to claim 1, wherein said substrate is a transparent inorganic glass.

7. Pane according to claim 1, wherein said substrate is a transparent organic glass plate.

8. Pane according to claim 1, wherein said substrate is a transparent organic film.

9. Pane according to claim 1, wherein at least one of the first and the fifth layers is deposited as a double layer of two different materials with a total thickness of 20–70 nm.

10. Pane according to claim 1, wherein an additional layer having a thickness of 0.5 to 5 nm is deposited between the first and second layers, said additional layer being a substoichiometric oxide of at least one of Ti, Cr, and Nb, or of an alloy with at least 15 atom % of one of Ti, Cr, and Nb.

* * * * *